United States Patent [19]
Dickson

[11] Patent Number: 6,132,217
[45] Date of Patent: Oct. 17, 2000

[54] METHOD AND APPARATUS FOR TEACHING RELATIONSHIP OF TRIGONOMETRIC FUNCTIONS BETWEEN UNIT CIRCLE AND RECTANGULAR COORDINATE SYSTEM

[76] Inventor: Marilyn M. Dickson, 7913 S. Desert Ridge Cove, Salt Lake City, Utah 84121

[21] Appl. No.: 09/220,130

[22] Filed: Dec. 23, 1998

[51] Int. Cl.[7] .............................. G09B 23/02; G09B 23/04
[52] U.S. Cl. .......................... 434/211; 434/214; 434/215; 434/216
[58] Field of Search .................................... 434/188, 211, 434/214, 215, 216

[56] References Cited

U.S. PATENT DOCUMENTS 5,114,347   5/1992   Camp ........................................ 434/214

OTHER PUBLICATIONS

Cuisenaire Dale Seymour Publications, 1998 Product Catalog, pp. 55–56.
Jonathan Shear, "Visual Thinking, Algebraic Thinking, and a Full Unit–Circle Diagram," Mathematics Teacher, Oct. 1985.

Primary Examiner—Kien T. Nguyen
Assistant Examiner—John Edmund Rovnak
Attorney, Agent, or Firm—Thorpe, North & Western, LLP

[57] ABSTRACT

A method and apparatus for teaching a relationship of trigonometric functions between a unit circle and a rectangular coordinate system has a primary flexible member movable between a circular configuration defining the unit circle, and a straight configuration defining the rectangular coordinate system. A plurality of secondary linear members are removably coupled at attachment points along the flexible member. The linear members are movable with the flexible member between a unit circle position and a rectangular coordinate position. In the unit circle position, each linear member is oriented with respect to the unit circle to demonstrate and represent a trigonometric function. In the rectangular coordinate position, each linear member extends perpendicularly from the flexible member defining trigonometric wave forms. The flexible member and linear members physically represent the trigonometric functions and moving the members between the two systems demonstrates the relationship between them. The flexible member and linear members may be disposed on a base with an upper surface. A circular wall may be provided to form the flexible member into the circular configuration.

30 Claims, 13 Drawing Sheets

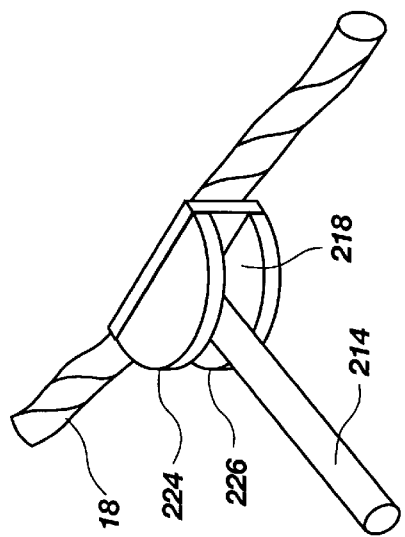
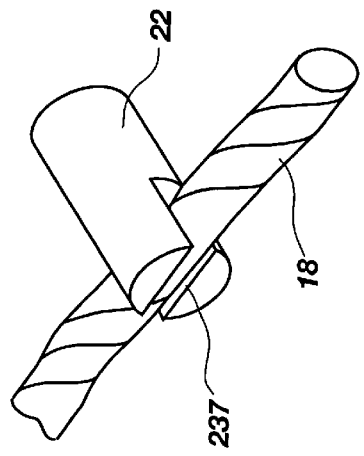
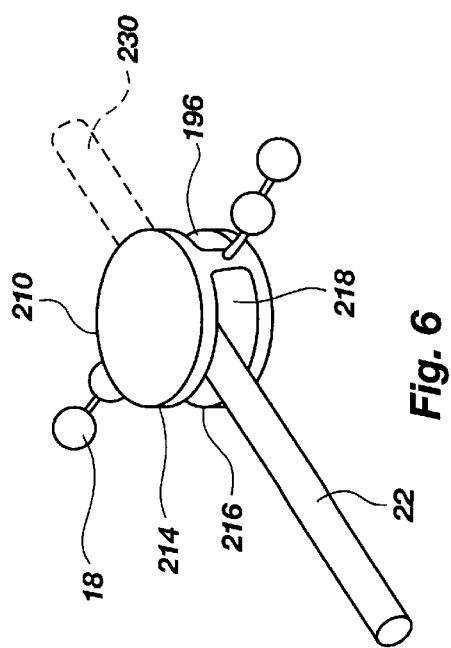
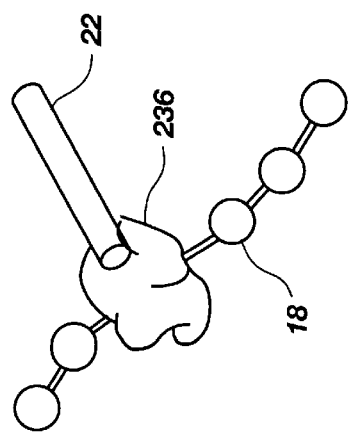

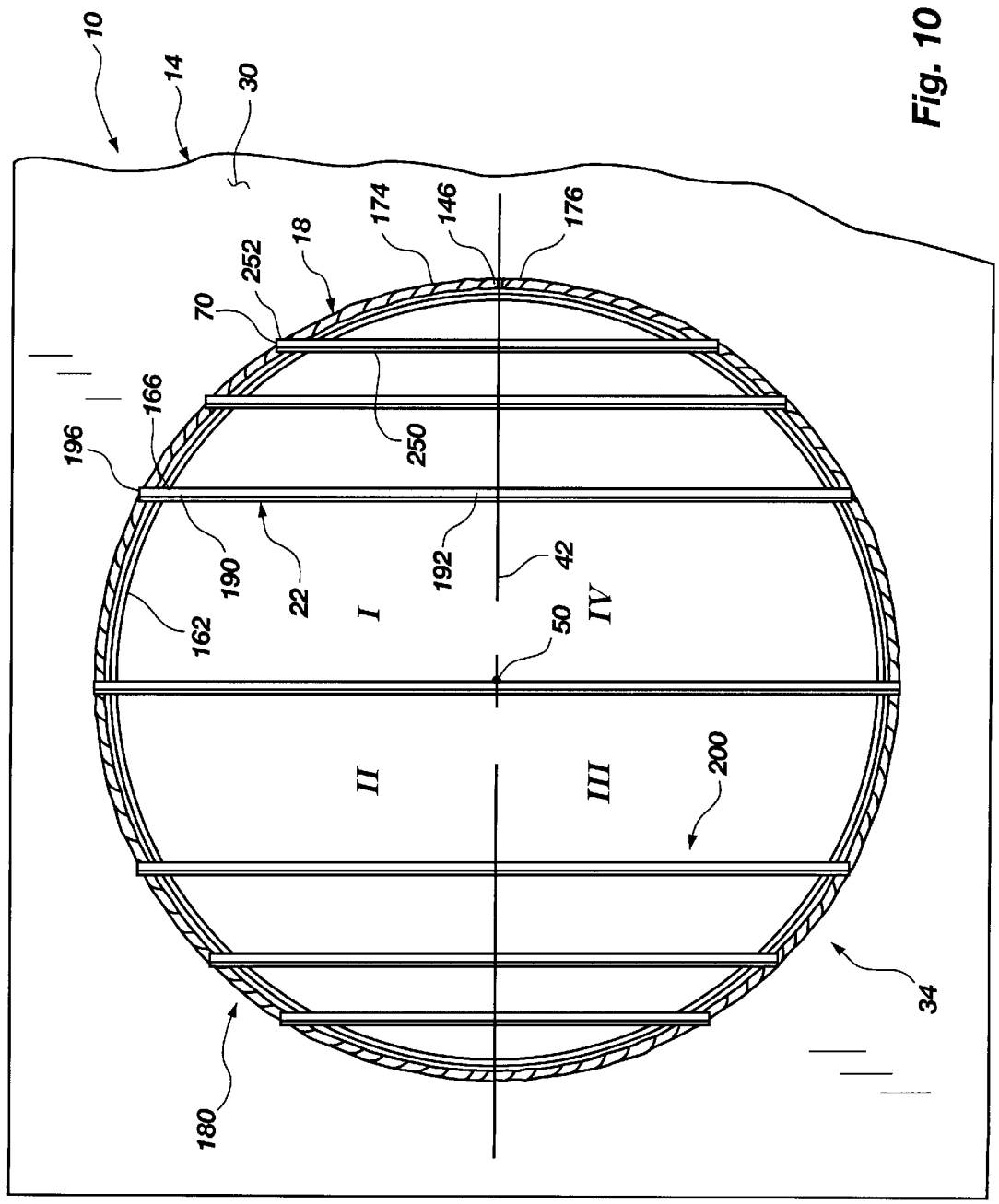

METHOD AND APPARATUS FOR TEACHING RELATIONSHIP OF TRIGONOMETRIC FUNCTIONS BETWEEN UNIT CIRCLE AND RECTANGULAR COORDINATE SYSTEM

BACKGROUND OF THE INVENTION

1. The Field of the Invention.

The present invention relates generally to a method and apparatus for teaching or representing the relationship of the trigonometric functions between the unit circle and the Cartesian or rectangular coordinate system. More particularly, the present invention relates to a method or apparatus in which the trigonometric functions are physically represented and transformed between a unit circle configuration and a rectangular coordinate system configuration.

2. The Background Art.

Teaching is most often performed by a teacher lecturing a group of students on a given subject. While some students have the desire, self discipline, focus, attention and maturity to learn, other students may face challenges to learning. Typically, the teacher is faced with the challenge of grasping the students' attention and causing them to think. It is generally considered that the learning and teaching process is facilitated by visualization, or the ability of the teacher to show and demonstrate what is being taught, and the ability of the student to perceive. Furthermore, it is generally considered that the learning process is facilitated by hands-on experience. Students seem more interested in, and better able to understand, matters which they can visualize and touch. Therefore, there is a continuing desire to develop new visual aids and hands-on experiences to aid in teaching.

For example, trigonometric functions involve the ratios between the sides of a right triangle 900 having legs 904 and 908 and a hypotenuse 912, as shown in FIG. 21. The ratios only depend on the size of the angle θ. A unit circle 920 is often used to visually describe or represent the various trigonometric functions. The unit circle 920 has a center point 924, or origin, and a radius of one, or the hypotenuse 912 of length one. Various lines represent the trigonometric functions and are oriented with respect to the unit circle 920 based on the particular trigonometric function.

In addition, the trigonometric functions are periodic functions which may be defined in the Cartesian or rectangular coordinate system. Although the trigonometric functions are usually taught with respect to both the unit circle and rectangular coordinate system, the relationship between the unit circle and rectangular coordinate system is rarely, if ever, pointed out. Text books may even proceed directly from the representation of the trigonometric functions in the unit circle, to a representation in the rectangular coordinate system, without the slightest indication that the two systems may relate, or how. Therefore, it would be desirable to teach this relationship between the two systems in order to further the understanding of the trigonometric functions.

Therefore, it would be advantageous to develop a method and apparatus to teach the relationship of the trigonometric functions between the unit circle and the rectangular coordinate system. It would also be advantageous to develop such a method and apparatus capable of visually demonstrating the relationship. It would also be advantageous to develop such a method and apparatus that would allow hands-on experimentation.

OBJECTS AND SUMMARY OF THE INVENTION

It is therefore an object of the present invention to provide a method and apparatus for furthering the understanding of the trigonometric functions.

It is another object of the present invention to provide such a method and apparatus for facilitating teaching of the trigonometric functions.

It is another object of the present invention to provide such a method and apparatus for teaching and representing the trigonometric functions between the unit circle and the rectangular coordinate system.

It is another object of the present invention to provide such a method and apparatus which visually represents the relationship of the trigonometric functions between the two systems.

It is yet another object of the present invention to provide such a method and apparatus for hands on experimentation.

The above objects and others not specifically recited are realized in a specific illustrative embodiment of an apparatus for teaching a relationship of trigonometric functions between a unit circle and a rectangular coordinate system having a primary flexible member and a plurality of secondary linear members. The flexible member physically represents the unit circle and the horizontal axis of the rectangular coordinate system, while the linear members physically represent the trigonometric functions at given angles. The flexible member and the linear members advantageously are movable between the two systems to demonstrate the relationship between the two systems.

The flexible member is elongated and has first and second ends. The flexible member is movable between a series of discrete visual positions and configurations including a first circular configuration and a second linear configuration. In the first circular configuration, the primary member is disposed in a circle centered about a center point defining a unit circle. In the second linear configuration, the primary member is disposed in a line intersecting an origin point defining a horizontal axis of a rectangular coordinate system.

The linear members are elongated and have first and second ends. Each linear member is removably coupled to the flexible primary member at one of a series of spaced apart attachment points disposed along the primary member. Each of the spaced apart attachment points is defined by an angle from a horizontal reference line which intersects the center point when the primary member is in the first circular configuration. Thus, each linear member corresponds to a particular angle. In addition, the plurality of secondary members are sized to demonstrate a particular trigonometric function when in the first unit circle position.

The linear members are moveable between a series of discrete visual positions and configurations including a first unit circle position and a second position. In the first unit circle position, each of the plurality of secondary members is oriented with respect to the unit circle to demonstrate a particular trigonometric function. In the second position, each of the plurality of secondary members is disposed perpendicularly to the horizontal axis defined by the flexible primary member when the primary member is in the second linear configuration. The first ends of each of the plurality of secondary members are coupled to the flexible primary member, while the second ends define a wave form or periodic function.

The secondary members preferably remain coupled to the primary member as the primary member moves between the first circular configuration and the second linear configuration. Thus, the primary member and secondary members move together.

The secondary members may be oriented in the unit circle position to demonstrate any of the trigonometric functions. For example, to demonstrate a sine function, each of the secondary members has a first end coupled to one of the attachment points of the primary member, and the second end disposed on the horizontal reference line. In addition, each secondary member is oriented perpendicularly to the horizontal reference line. In the second position, the second ends of the linear members define a sinusoidal wave. The remaining trigonometric functions are similarly demonstrated.

In accordance with one aspect of the present invention, the flexible member and linear members may be movably disposed on a base having a flat upper surface. The upper surface has indicia depicting a unit circle with a center point, and a rectangular coordinate system with an origin point. A circular wall may be formed in the upper surface about the center point of the unit circle for helping to form the flexible member into the circular configuration. The circular wall has a plurality of spaced apart openings formed therein through which the linear members extend.

In accordance with another aspect of the present invention, the apparatus has coupling means for removably coupling the secondary members to the primary member. The coupling means may be a plurality of attachment members each coupled to the primary member at one of the attachment points. Each attachment member has opposing, flexible flanges defining a space therebetween for receiving an end, or other portion, of one of the secondary members. Thus, the flanges frictionally grasp the end of the secondary member.

Alternatively, the coupling means may be a gummy substance at each attachment point for sticking to an end, or other portion, of one of the secondary members. Alternatively, the coupling means may be a slot formed in at least one end of each secondary member for receiving the primary member therein.

In accordance with another aspect of the present invention, the apparatus has retaining means for retaining the position and configuration of the secondary members until moved. The retaining means may be a plurality of channels formed in the upper surface of the base to receive the plurality of secondary members. Alternatively, the retaining means comprises a plurality of pegs disposed on the upper surface of the base.

A method of using the above described apparatus includes positioning and configuring the flexible member and linear members between a first unit circle configuration, and a second rectangular coordinate configuration. In the first unit circle configuration, the flexible member is configured into a circle centered about a center point to define a unit circle. The linear members are oriented with respect to the unit circle defined by the flexible member based on a particular trigonometric function to be demonstrated. Preferably, the linear members are coupled to the flexible member.

In the second rectangular coordinate configuration, the flexible member is configured in a straight horizontal line intersecting an origin point defining a horizontal axis of a rectangular coordinate system. The linear members are configured to extend perpendicularly from the straight horizontal line formed by the flexible member.

The flexible member and linear members may be reconfigured between the unit circle configuration and the rectangular coordinate configuration by moving and orienting the flexible member and linear members. Additional objects and advantages of the invention will be set forth in the description which follows, and in part will be apparent from the description, or may be learned by the practice of the invention without undue experimentation. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which:

FIG. 6 is a perspective view of a preferred embodiment of attachment means of the apparatus;

FIG. 7 is a perspective view of an alternative embodiment of the attachment means of the apparatus;

FIG. 8 is a perspective view of an alternative embodiment of the attachment means of the apparatus;

FIG. 9 is a perspective view of an alternative embodiment of the attachment means of the apparatus;

FIG. 10 is a partial top view of the preferred embodiment of the apparatus with primary and secondary members in a first position and representing a sine function;

DETAILED DESCRIPTION

Figure 1:
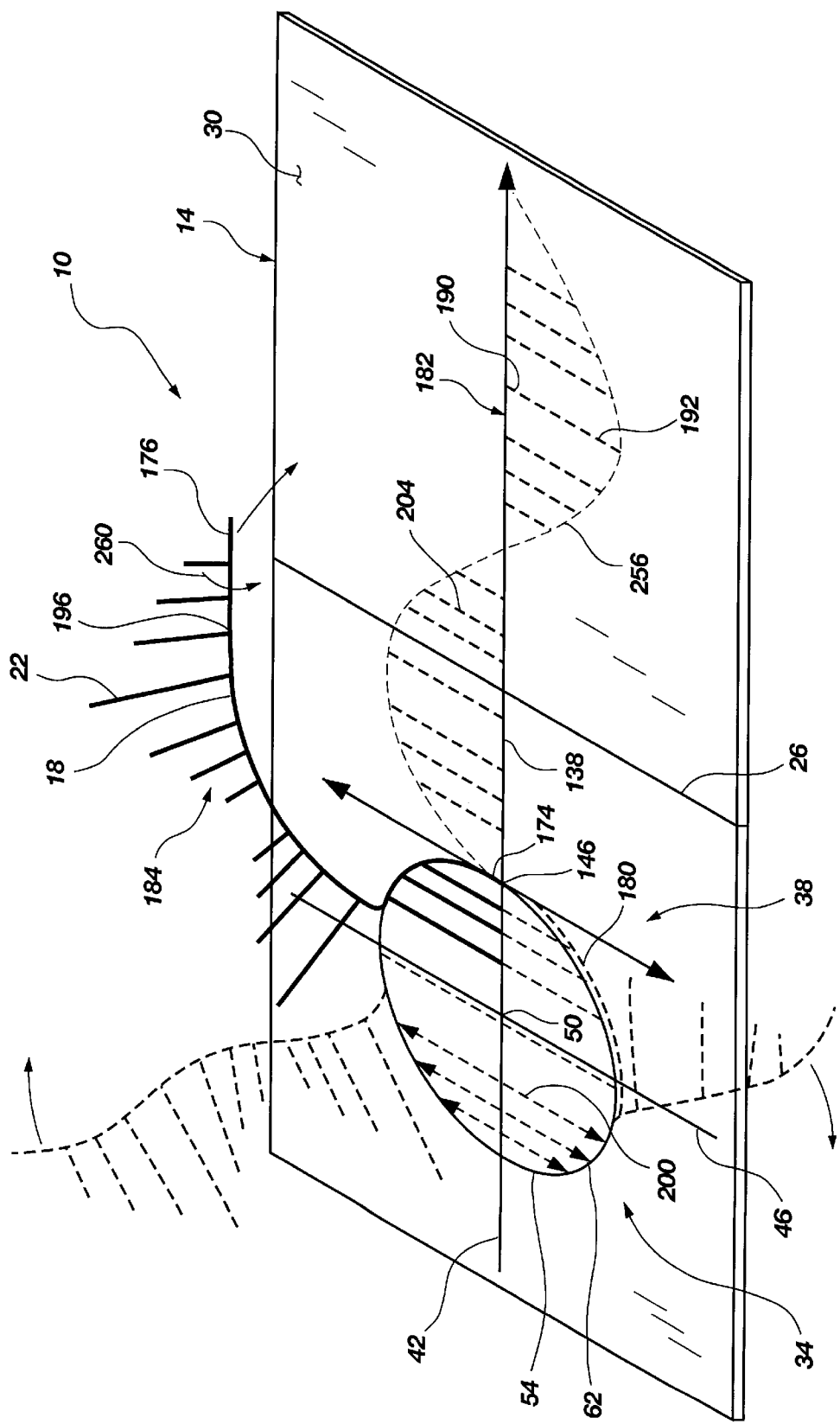
FIG. 1 is a perspective view of a preferred embodiment of an apparatus for teaching and representing trigonometric functions between a unit circle and a rectangular coordinate system in accordance with the principles of the present invention.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

Figure 2:
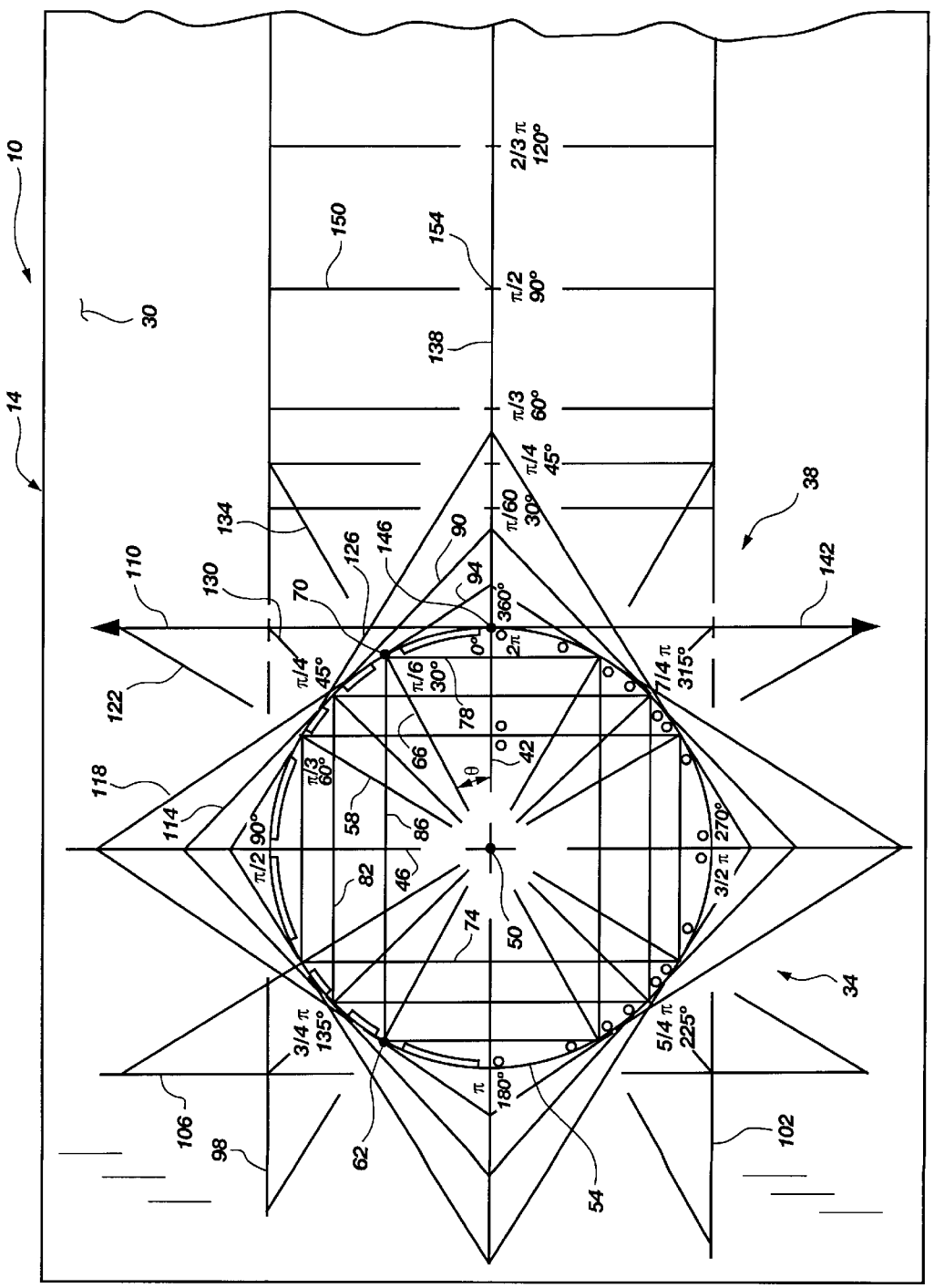
FIG. 2 is a partial top view of a preferred embodiment of a base of the apparatus.

As illustrated in FIGS. 1 and 2, an apparatus, indicated generally at 10, in accordance with the present invention is shown for teaching a relationship of the trigonometric functions between a unit circle and a rectangular, or Cartesian, coordinate system. In accordance with one aspect of the present invention, the apparatus 10 advantageously provides a physical representation of the trigonometric functions, and the unit circle and rectangular coordinate system, which provides students with a hands-on learning experience, and a physical embodiment of a mathematical concept with which the students may experiment to encourage learning, enhance retention and comprehension, and facilitate teaching. In accordance with another aspect of the present invention, the apparatus 10 advantageously provides a physical transition between the unit circle and the rectangular coordinate system with a series of discrete visual positions and configurations, that allows the student to actually perceive the mathematic relationships, thus facilitating learning and teaching. Although the present invention is described with particular reference to teaching, it is of course understood that the present invention may be used for any desired purpose, including, for example, physically representing the trigonometric functions and their transformation between coordinate systems or definition systems.

The apparatus 10 advantageously includes a base or base member 14, a primary flexible member 18, and a plurality of secondary linear members 22, as shown in FIG. 1. The base 14 is preferably rectangular and has upper and lower edges or sides, and left and right edges or sides. In addition, the base 14 is preferably a rigid member so that it may be handled and moved without damage. The base 14 may be a single integral unit so that it may be easily manufactured and used. The base 14 may be formed of a sheet of plastic, cardboard, wood, foam board, etc. A rigid, unified base 14 may be held up for display, hung from a wall, propped on an easel, placed on a table or the ground, or otherwise disposed for purposes of display or handling. For example, the rigid base 14 may be hung from a blackboard while a teacher demonstrates the trigonometric function, and then disposed on a table for students to perform experiments.

Alternatively, the base 14 may be a flexible member so that it may be rolled or folded for transportation or storage. In addition, the base 14 may have one or more partitions 26 (FIG. 1) dividing the base 14 into two or more sections so that the base may be disassembled. For example, the base 14 may be quite large so that it may be adequately viewed from a large distance by many people, but disassembled, folded, or rolled into a smaller size to be moved about.

The base 14 has an upper surface 30 which is preferably substantially flat. Indicia is formed on the upper surface 30 depicting a unit circle, indicated at 34, and a rectangular coordinate system, indicated at 38. The indicia not only depicts or defines the unit circle 34 and rectangular coordinate system 38, but provides guide lines or reference lines to facilitate use of the apparatus 10 as discussed later.

Figure 3:
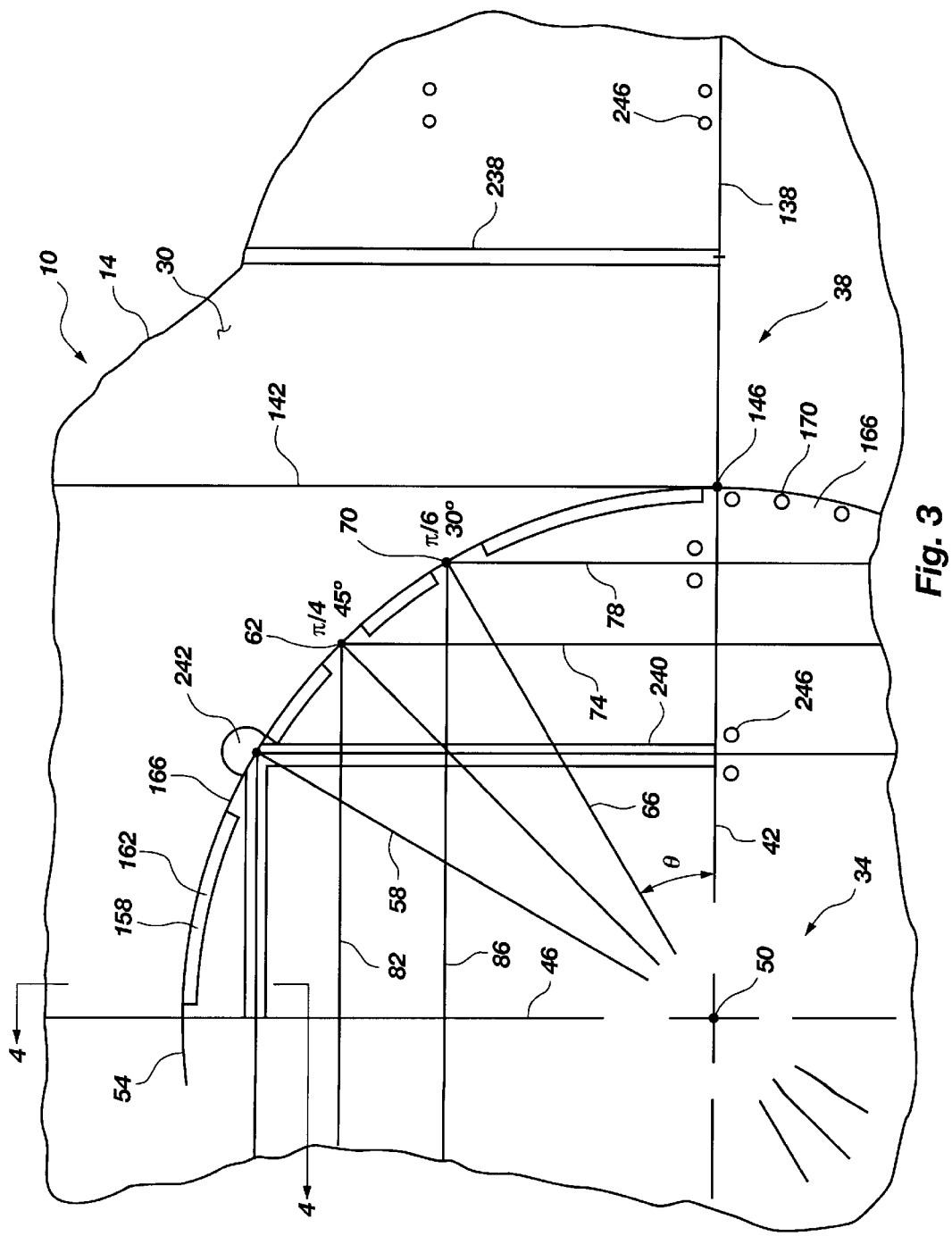
FIG. 3 is a different partial top view of the preferred embodiment of the base of the apparatus.

Referring to FIGS. 2 and 3, the unit circle 34 includes a horizontal reference line 42 and a vertical reference line 46. The vertical reference line 46 is formed perpendicularly to the horizontal reference line 42, and intersects the horizontal reference line 42 at a point defining an origin point or center point 50. A circular line or circle 54 is formed about the center point 50 and has a radius of one unit. The horizontal and vertical reference lines 42 and 46 divide the circle 54 into quadrants as is well known. The quadrants include first, second, third and fourth quadrants. The first and second quadrants forming the upper portion of the circle 54, the third and fourth quadrants forming the lower portion of the circle, the second and third quadrants forming the first or left portion of the circle, and the first and fourth quadrants forming the second or right portion of the circle. The quadrants may be identified by indicia, indicated by I, II, III and IV in FIG. 10.

A plurality of angle lines 58 each may radiate from the center point 50 to one of a plurality of angle points 62 on the circle 54. The angle lines 58 form an angle θ with respect to the horizontal reference line 42. For example, a first angle line 66 extends from the center point 50 to the circle 54 at an angle of 30 degrees with respect to the horizontal reference line 42. The angle lines 58 preferably form angles θ which are common or suitable for instruction, including for example the angles 0°, 30°, 45°, 60°, 90°, 120°, 135°, 150°, 180°, 210°, 225°, 240°, 270°, 300°, 315°, 330°, and 360° (or 0, π/6, π/4, π/3, π/2, 2π/3, 3π/4, 5π/6, π, 7π/6, 5π/4, 4π/3, 3π/2, 5π/3, 7π/4, 11π/6, and 2π). It will be noted that the angle lines 58 define terminal rays or hypotenuses.

The angle points 62 are defined by the angles θ at which the angle lines 58 intersect the circle 54. For example, a first angle point 70 is defined by the intersection of the first angle line 66. Each angle point 62 may be designated by indicia indicating a particular angle as shown. The remaining angle lines 58 may be similarly designated.

The horizontal and vertical reference lines 42 and 46 and the circle line 54 form a basic unit circle 34. Additional lines may be provided which represent various trigonometric functions, and which provide guidance for placement of the secondary members as will be discussed more fully below. Referring to FIG. 2, a plurality of sine lines 74 each extend from one of the angle points 62 to the horizontal reference line 42. The sine lines 74 are oriented perpendicularly to the horizontal reference line 42. Thus, each sine line 74 corresponds to a different angle θ, angle line 58, and angle point 62. Each sine line 74 represents the value of the sine function for the particular angle θ to which the sine line 74 corresponds. For example, a first sine line 78 extends from the first angle point 70 perpendicularly to the horizontal reference line 42 and represents the value of the sine function for 30 degrees.

In addition, a plurality of cosine lines 82 each extend from one of the angle points 62 to the vertical reference line 46. The cosine lines 82 are oriented perpendicularly to the vertical reference line 46. Each cosine line 82 corresponds to a different angle θ, angle line 58, and angle point 62. Each cosine line 82 represents the value of the cosine function for the particular angle θ to which the sine line 74 corresponds.

For example, a first cosine line 86 extends from the first angle point 70 perpendicularly to the vertical reference line 46 and represents the value of the cosine function for 30 degrees.

A plurality of tangent lines 90 each extend from one of the angle points 62 to the horizontal reference line 42. The tangent lines 90 are oriented tangent to the circle line 54. Each tangent line 90 corresponds to a different angle θ, angle line 58, and angle point 62. Each tangent line 90 represents the value of the tangent function for the particular angle θ to which the tangent line 90 corresponds. For example, a first tangent line 94 extends from the first angle point 70 tangent to the circle line 54 to the horizontal reference line 42 and represents the value of the tangent function for 30 degrees. It should be noted that the tangent lines corresponding to angles of 90 and 270 degrees do not extend to the horizontal reference line 42, but extend parallel with the horizontal reference line 42.

The above described lines depict the unit circle and graphically represent the basic trigonometric functions, or the sine, cosine, and tangent functions. The other trigonometric functions, or the secant, cosecant, and cotangent functions, may also be represented. The secant and cosecant representations differ from the typical unit circle description in order to facilitate use of the apparatus as will be discussed later. An upper reference line 98 and a lower reference line 102 extend parallel to the horizontal reference line 42. The upper reference line 98 is tangent at the top of the circle 54 while the lower reference line is tangent at the bottom of the circle 54. The upper and lower reference lines 98 and 102 may be the same lines as the tangent lines for 90 and 270 degrees. In addition, first and second side reference lines 106 and 110 extend parallel to the vertical reference line 46 with the first side reference line 106 being tangent at a first or left side of the circular line 54 and the second side reference line 110 being tangent at a second or right side of the circle 54. Thus, the upper and lower reference lines 98 and 102 are formed on opposite upper and lower sides of the circle 54 while the first and second reference lines 106 and 110 are formed on opposite sides of the circle 54.

A plurality of cotangent lines 114 each extend from one of the angle points 62 to the vertical reference line 42. Thus, the cotangent lines 114 are similar to the tangent lines 90, but extend to the vertical reference line 46 rather than the horizontal reference line 42. The cotangent lines 114 are oriented tangent to the circle 54 and each cotangent line 114 corresponds to a different angle θ, angle line 58, and angle point 62. Each cotangent line 114 represents the value of the cotangent function for the particular angle θ to which the cotangent line 114 corresponds. For example, a first cotangent line 118 extends from the first angle point 70 tangent to the circle 54 to the vertical reference line 46 and represents the value of the cotangent function for 30 degrees. It should be noted that the cotangent lines corresponding to angles of 0, 180 and 360 degrees do not extend to the vertical reference line 46, but extend parallel with the vertical reference line 46. Thus, the cotangent lines at these points may be the same as the first and second side reference lines 106 and 110.

Figure 21:
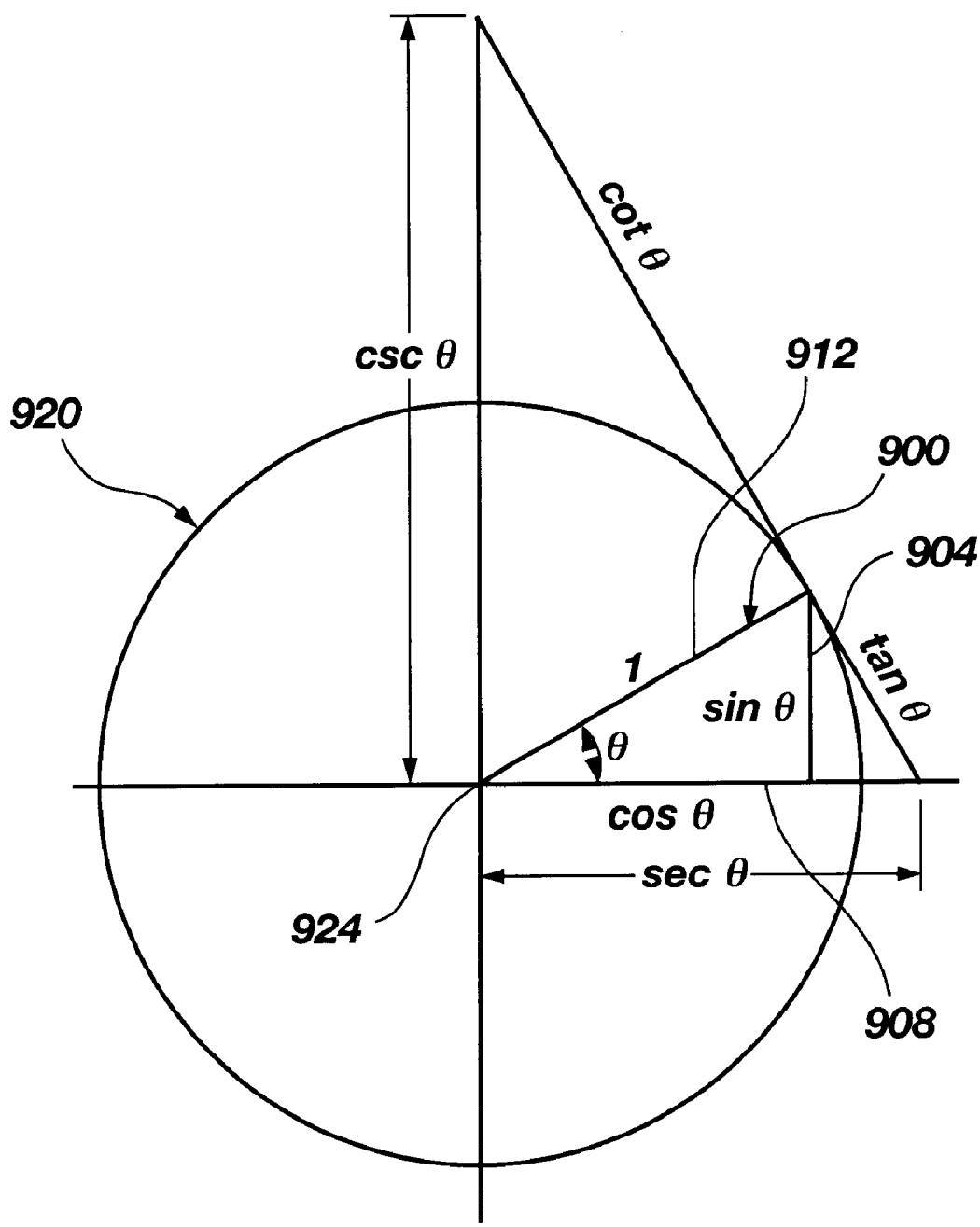
FIG. 21 is a top view of a prior art unit circle.

Typical unit circle depictions represent the secant and cosecant functions along the horizontal and vertical reference lines, respectively. The secant and cosecant functions may be similarly represented in this way with the present invention to teach Pythagorean identities, as shown in FIG. 21, without making use of the unwrapping feature. In accordance with the present invention, however, the secant and cosecant functions may be represented differently to facilitate use of the secondary members as described later.

A plurality of secant lines 122 extend radially from the center point 50, through one of the angle points 62, to one of either the first or second reference lines 106 or 110. Each secant line 122 represents the value of the secant function for the particular angle θ to which the secant line 122 corresponds. For example, a first secant line 126 extends from the center point 50, through the first angle point 70, to the second reference line 110 and represents the value of the secant function for 30 degrees.

Likewise, a plurality of cosecant lines 130 extend radially from the center point 50, through one of the angle points 62, to one of either the upper or lower reference lines 98 or 102. Each cosecant line 130 represents the value of the cosecant function for the particular angle θ to which the cosecant line 130 corresponds. For example, a first cosecant line 134 extends from the center point 50, through the first angle point 70, to the upper reference line 98 and represents the value of the cosecant function for 30 degrees. It should be noted that the secant and cosecant lines 122 and 130, and the angle lines 58, overlap.

The rectangular coordinate system 38 includes a horizontal axis line 138. A vertical axis line 142 intersects, and is formed perpendicularly to, the horizontal axis line 138 at a point defining an origin point 146. A plurality of spaced-apart, vertical lines 150 intersect, and are formed perpendicularly to, the horizontal axis line 138 at a plurality of points 154 corresponding to the plurality of angle points 62.

It will be noted that the unit circle 34 and the rectangular coordinate system 38 are located with respect to one another, or are disposed adjacent one another, in a contacting manner, such that they may share common lines. The origin point 146 of the rectangular coordinate system 38 and the 0 angle point on the circle 54 of the unit circle 34 are the same point. In addition, the horizontal axis line 138 of the rectangular coordinate system 38 is colinear, or overlaps, the horizontal reference line 42 of the unit circle 34. Furthermore, the vertical axis line 142 of the rectangular coordinate system 38 is colinear, or overlaps, the second side reference line 110 of the unit circle 34. The adjacent and contacting relationship of the unit circle 34 and rectangular coordinate system 38 facilitate the use of the apparatus 10 as discussed more fully below, but it is of course understood that they may be separated, or disposed at different locations.

Figure 4:
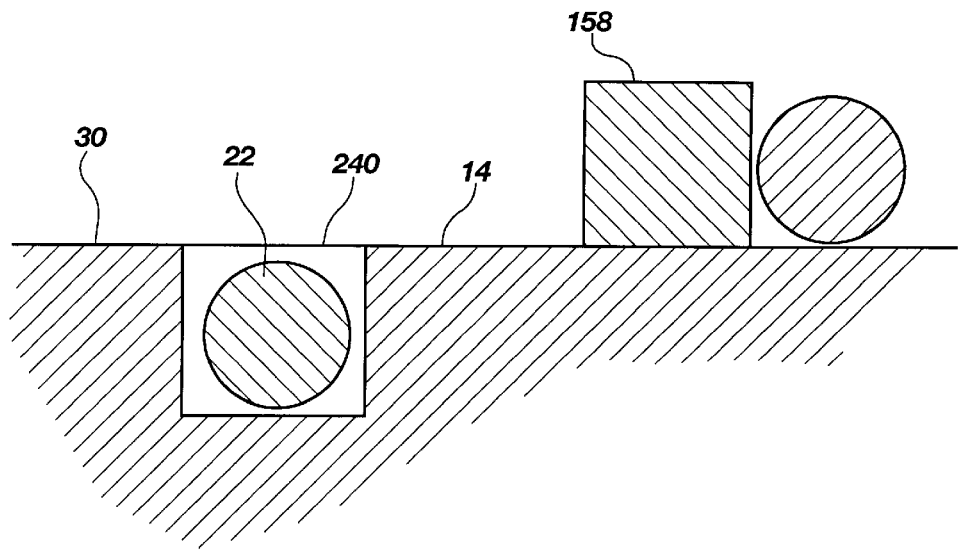
FIG. 4 is a cross section view of the preferred embodiment of the base of the apparatus taken along line 4—4 of FIG. 3.

Referring to FIGS. 3 and 4, the base 14 advantageously has a circular wall 158 formed in, or disposed on, the upper surface 30. The wall 158 is formed about the center point 50 and borders the circle 54, thus defining the unit circle. The wall 158 may be formed of a plurality of spaced-apart, arcuate sections 162 defining a plurality of spaced apart openings 166 formed therein, or may be a plurality of spaced-apart pegs 170 defining openings 166 therebetween, as shown in FIG. 3. The openings 166 are located about the unit circle 34 or circle 54 at the angle points 62.

Referring again to FIG. 1, the apparatus 10 advantageously has a primary flexible member 18 movably disposed on the upper surface 30 of the base 14. The flexible member 18 is elongated and has a first end 174 and a second end 176. The flexible member 18 may be chain, cord, string, etc. The first end 174 may be pivotally coupled to the 0 angle point of the unit circle 34, and/or the origin point 146 of the rectangular coordinate system 38. The flexible member 18 is moveable and may be configured between a first circular configuration, indicated at 180, and a second linear configuration, indicated at 182.

In the first circular configuration 180, the flexible member 18 is disposed in a circle centered about the center point 50, and formed around the circular wall 158, as shown in FIGS. 4 and 10. Thus, the flexible member 18 defines the unit circle in the first circular configuration 180 and physically represents the unit circle 34. The first and second ends 174 and 176 may be united and disposed at the 0 angle point of the unit circle 34 to form a continuous circle. Preferably, the flexible member 18 has a length which is the same as the circumference of the unit circle 34, or circle 54.

In the second linear configuration 182, the flexible member 18 is disposed in a straight line and defines the horizontal axis 138. The linear member 18 preferably intersects the origin point 146 and has the first end 174 disposed on origin point 146. As indicated above, the 0 angle point of the unit circle 34 and the origin point 146 of the rectangular coordinate system 38 are preferably the same point, and the first end 174 of the flexible member 18 is preferably pivotally coupled to the base 14 at the origin point 146. Thus, the flexible member 18 may be moved between the first circular configuration 180 on the unit circle 34 and the second linear configuration 182 on the rectangular coordinate system 38 by "unwrapping" and "wrapping" the flexible member 18 around the unit circle 34 and stretching the flexible member out over the rectangular coordinate system 38. The flexible member 18 moves between the two positions or configuration 180 and 182 through a series of discrete visual positions, indicated at 184. Thus, the flexible member 18 provides a physical representation of the unit circle 34 and rectangular coordinate system 38, as well as a physical and a visual representation of the transformation between the two.

Figure 5:
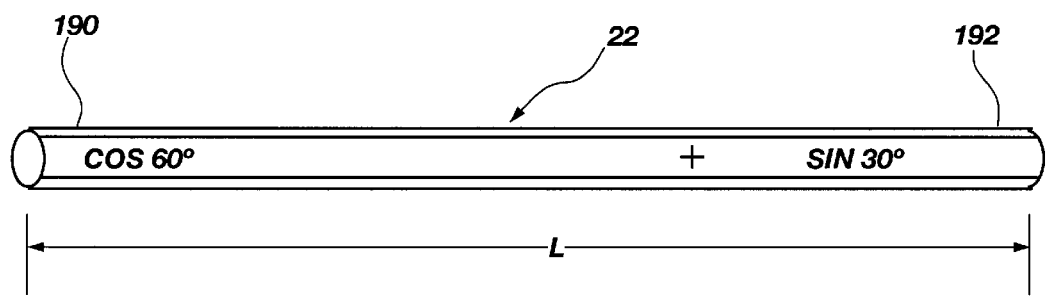
FIG. 5 is a perspective view of a preferred embodiment of a secondary linear member of the apparatus.

The apparatus 10 advantageously has a plurality of secondary linear members 22 coupled to the primary flexible member 18. The linear members 22 preferably are elongated, rigid, and straight members having first and second ends 190 and 192, as shown in FIG. 5. The linear members 22 may be rods, dowels, or sticks. The linear members 22 are coupled to a series of spaced apart attachment points 196 disposed along the primary member 18. The attachment points 196 correspond to the plurality of angle points 62 (FIGS. 2 and 3) and are themselves defined by angles with respect to the horizontal reference line (FIGS. 2 and 3). In addition, the linear members 22 are preferably removably coupled to the flexible member 18 so that the linear members 22 may be removed and replaced with other linear members 22 as discussed more fully below.

Like the flexible member 18, the linear members 22 are movably disposed on the upper surface 30 of the base 14. The linear members 22 are moveable and may be configured between a first unit circle position, indicated at 200, and a second position, indicated at 204. In the first unit circle position 200, each of the linear members 22 is disposed on the unit circle 34, while in the second position 204, each of the linear members 22 is disposed on the rectangular coordinate system 38. The linear members 22 preferably remain coupled to, and move with, the flexible member 18 as the flexible member 18 moves between the first circular configuration 180 and the second linear configuration 182.

In the first unit circle position 200, each of the linear members 22 extends between an attachment point 192 on the flexible member 18, and one of the reference lines, such as the horizontal reference line 42, the vertical reference line 46, the upper and lower reference lines 98 and 102, or the first and second side reference lines 106 and 110 (See FIG. 2). Which linear members 22 are coupled to the flexible member 18, and which reference line the linear members 22 extend to, depends on the trigonometric function being demonstrated, as discussed more fully below.

In the second position 204, each of the linear members 22 is disposed on the rectangular coordinate system 38. Each of the linear members 22 is disposed perpendicularly to the flexible member 18. The first end 190 of each linear member 22 is disposed at or coupled to the flexible member 18 while the second end 192 defines a trigonometric wave form, or periodic function, in the rectangular coordinate system 38.

Therefore, the linear members 22 may be moved between the first unit circle configuration 200 on the unit circle 34, and the second configuration 204 on the rectangular coordinate system 38 as the flexible member 18 is "unwrapped" and "wrapped" between the first circular configuration 180 on the unit circle 34 and the second linear configuration 182 on the rectangular coordinate system 38. The linear members 22 move with the flexible member 18 between the two positions or configurations 200 and 204 through a series of discrete visual positions, also indicated at 184. Thus, the linear members 22 also provide a physical representation of the function on the unit circle 34 and rectangular coordinate system 38, as well as a physical and a visual representation of the transformation between the two.

As indicated above, although the linear members 22 may be permanently coupled to the flexible member 18, the linear members 22 are preferably removably coupled to the flexible member 18. For example, a number of flexible members may be provided with a number of linear members permanently coupled thereto, and each flexible member configured to demonstrate a different trigonometric function. Preferably, however, a single flexible member 18 is provided with a number of different sets of linear members 22 so that various linear members 22 can be combined with the flexible member 18 to demonstrate a desired trigonometric function. The linear members 22 are sized to demonstrate a particular trigonometric function.

Referring to FIG. 6, the apparatus 10 advantageously has coupling means for removably coupling the secondary linear members 22 to the primary flexible member 18. Preferably, the coupling means includes a plurality of attachment members 210 each coupled to the flexible member 18 at one of the attachment points 196. Each attachment member 210 has a pair of opposing, flexible flanges 214 and 216 defining a space 218 therebetween. The space 218 receives an end of the linear member 22 while the flanges 214 and 216 have inner surfaces that frictionally engage the outer surface of the linear member 22. The space 218 is preferably open between the flanges 214 and 216 so that the linear member 22 may be oriented at any angle with respect to the flexible member 18. The attachment members 210 may be circular or disk-shaped with the pair of flanges 214 and 216 on one side of the flexible member 18 and another pair of flanges on the other side so that linear members 22 may be attached from either side. The space 218 preferably extends entirely through the flanges 214 and 216 so that the linear members 22 may be slid through the attachment members 210, indicated by 220. Thus, the linear members 22 may be attached at their ends 190 or 192 (FIG. 5) or anywhere along their length. Referring to FIG. 7, another embodiment of the attachment members 222 is shown with flanges 224 and 226 that are semi-circular so that the linear members 22 must attach from a single side.

Figure 7B:
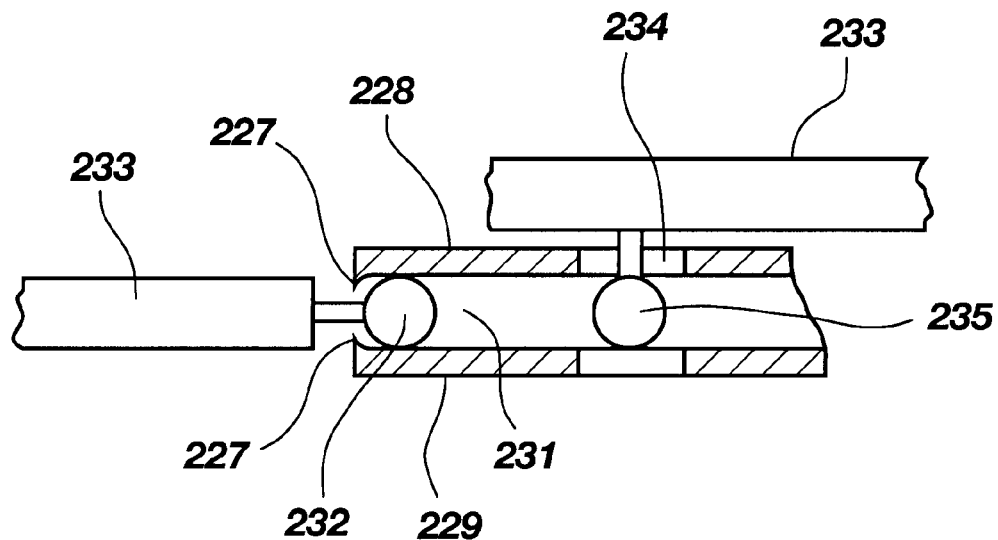
FIG. 7b is a cross sectional side view of an alternative embodiment of the attachment means of the apparatus.

Referring to FIG. 7b, lips 227 may be formed on perimeter edges of flanges 228 and 229, similar to flanges 214 and 216 shown in FIG. 6, and extending inwardly toward a space 230 to form a socket 231. The socket 231 receives a spherical protrusion or ball 232 which may be disposed on an alternative embodiment of a linear member 233. The lips 227 and flanges 228 and 229 are preferably formed of a flexible material which may expand outwardly away from the space 230 as the ball 232 is pressed into the socket 231. Thus, the attachment means may also comprise a ball and socket type coupling as described above. An aperture 234 may be formed through the flanges 228 and 229 for receiving a ball 235 formed at a position along the length of the linear member 233. Thus, the linear member 233 may be attached at any position along its length.

Figure 9B:
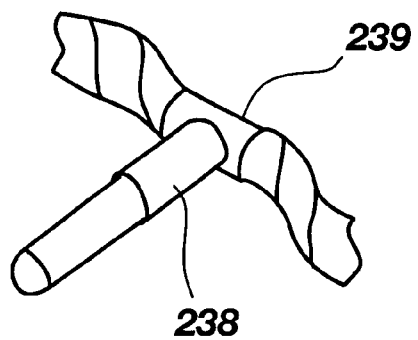
FIG. 9b is a perspective view of an alternative embodiment of the attachment means of the apparatus.

Referring to FIG. 8, the attachment means may be a gummy or tacky substance 236 disposed on the flexible member 18 which receives the linear member 22. Thus, the linear member 22 may be attached at any point along its length. The gummy substance 236 is pliable and flexible and may be a wall/picture hanging substance. Referring to FIG. 9, the attachment means may be a slot 237 formed longitudinally in an end of the secondary member 22 for receiving the flexible member 18. The slot 237 may be sized just smaller than the flexible member 18 so that the flexible member 18 must be compressed to be received within the slot 237, thus holding the secondary member 22. For example, the flexible member 18 may be string or cord which is received in the slot 237. It is understood that the above examples of coupling means are illustrative only and that any means for coupling may be used. For example, the linear members 22 may be magnetic, or have magnets 238 formed therein, which couple to magnets 239 in the flexible member 18 or attachment members, as shown in FIG. 9b.

Referring to FIGS. 3 and 4, the apparatus 10 also advantageously has retaining means for retaining the position and configuration of the linear members 22 on the unit circle 34, and/or the rectangular coordinate system 38, until moved. Preferably, the retaining means is a plurality of channels 240 formed in the upper surface 30 of the base 14 to receive the linear members 22. Referring to FIG. 3, the channels 240 are formed in many of the same locations as the lines. For example, the channels 240 may be formed between the circular line 54 and any of the reference lines, such as the horizontal reference line 42 or vertical reference line 46. Referring to FIG. 4, the linear members 22 lay in the channels 240 and are prevented from displacement until moved. Similarly, channels 240 may extend perpendicularly from the horizontal axis line 138. Referring again to FIG. 3, indentations 242 may be formed in the upper surface 30 to receive the attachment members 210. Alternatively, the retaining means may be a plurality of pegs 246. It is understood that the retaining means may be any means for retaining the position and configuration of the linear members.

As indicated above, the secondary linear members 22 are sized and configured to demonstrate a particular trigonometric function. Referring now to FIG. 10, the primary and secondary members 18 and 22 are disposed on the unit circle 34, with the flexible member in the first circular configuration 180 and the secondary members in the first unit circle configuration 200, and configured to illustrate the sine function. It will be noted that some of the detail has been removed from FIG. 10 for clarity.

The secondary members 22 are configured and located on the unit circle 34 to demonstrate the sine function. Each of the linear members 22 has the first end 190 coupled to one of the attachment points 196 of the flexible members 18. The linear members 22 pass through the openings 166 in the circular wall 162. Each of the linear members 22 also has the second end 192 disposed on the horizontal reference line 42. In addition, each linear member 22 is oriented perpendicularly to the horizontal reference line 22. The linear members 22 may be disposed in the channels 240 (FIG. 3) or between the pegs 246 (FIG. 3).

It will be noted that each linear member 22 corresponds to a particular angle e and represents the value of the sine function for that angle. Because the unit circle 34 or circular line 54 (FIGS. 2 and 3) has a radius of one unit, the length L of each linear member 22 equals the sine of the angle θ to which the linear member 22 corresponds. For example, a first linear member 250 is attached to the flexible member 18 at a first attachment point 252 which corresponds to the first angle point 70 of 30 degrees. A right triangle is formed by the first radial line 66, the horizontal reference line 42, and the first sine line 78, as shown in FIG. 3. The first linear member 250 physically represents the first sine line 78 (FIG. 3) and has a length L which equals the sine of 30 degrees. The same is true of the remaining linear members 22.

Referring again to FIG. 1, the secondary members 22 are configured to demonstrate the sine function. In the first unit circle position 200, the secondary members each represent the sine of the angle θ to which it corresponds. In addition, a plurality of secondary members 22 are positioned on the unit circle 34 at a plurality of angle points. As shown, the flexible member 18 and linear members 22 may be "unwrapped" from the unit circle 34 and disposed in the rectangular coordinate system 38. As the flexible member 18 and linear members 22 transition between the two, they move through a series of discrete visual positions and configurations which physically demonstrate the relationship of the trigonometric functions between the unit circle 34 and rectangular coordinate system 38. In the second position 204, the second ends 192 of the linear members 22 define a sinusoidal wave form, indicated at 256.

In the unit circle position 200, some of the linear members 22 are disposed on an upper portion of the unit circle 34, or coupled to a first half of the flexible member 18, while some are disposed on a lower portion of the unit circle 34, or coupled to a second half of the flexible member 18. Some of the linear members 22 are disposed in the first and second quadrants I and II and correspond to positive values of the sine functions, while some are disposed in the third and fourth quadrants III and IV and correspond to negative values of the sine functions.

In the second position 204, the linear members 22 disposed on the upper portion of the unit circle 34, or first and second quadrants I and II, are oriented to extend upwardly from the horizontal axis 138, and are thus disposed on the positive or upper portion of the rectangular coordinate system. The linear members 22 disposed on the lower portion of the unit circle 34, or third and fourth quadrants III and IV, are oriented to extend downwardly, and are thus disposed on the negative or lower portion of the rectangular coordinate system. Because the linear members 22 are pivotally coupled to the flexible member 18, the linear members 22 disposed on the lower portion of the unit circle 34 may be longitudinally rotated about the flexible member 18, indicated at 260, so that they may extend downwardly.

It should be noted that FIGS. 1 and 10 show the secondary members 22 sized, configured, and oriented to demonstrate the sine function. The secondary members 22 also may be sized, configured, and oriented to demonstrate the remaining trigonometric functions as will be described below.

Figure 11:
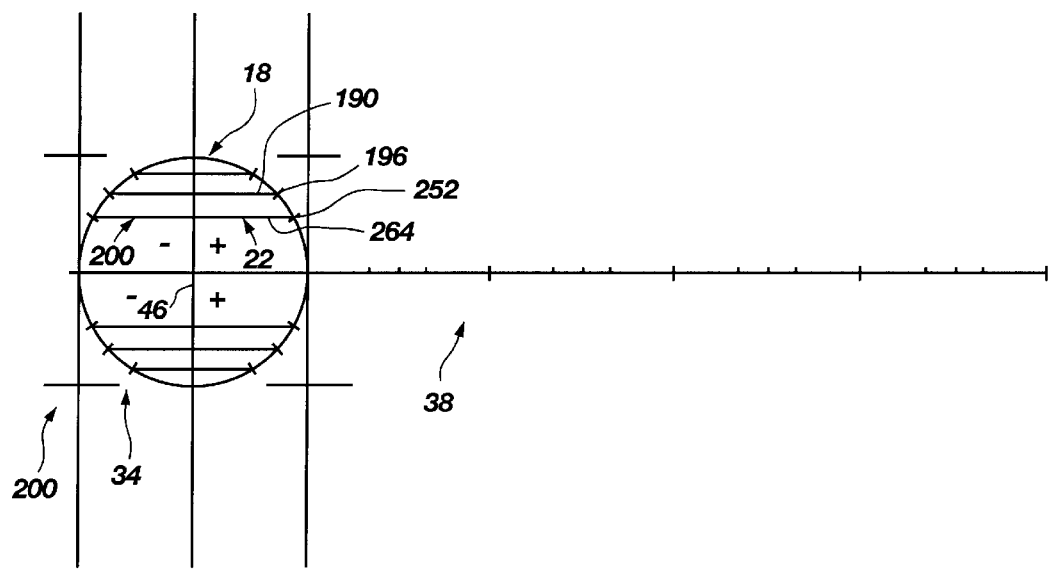
FIG. 11 is a top view of the apparatus with the primary and secondary members in a first position and representing a cosine function.
Figure 12:
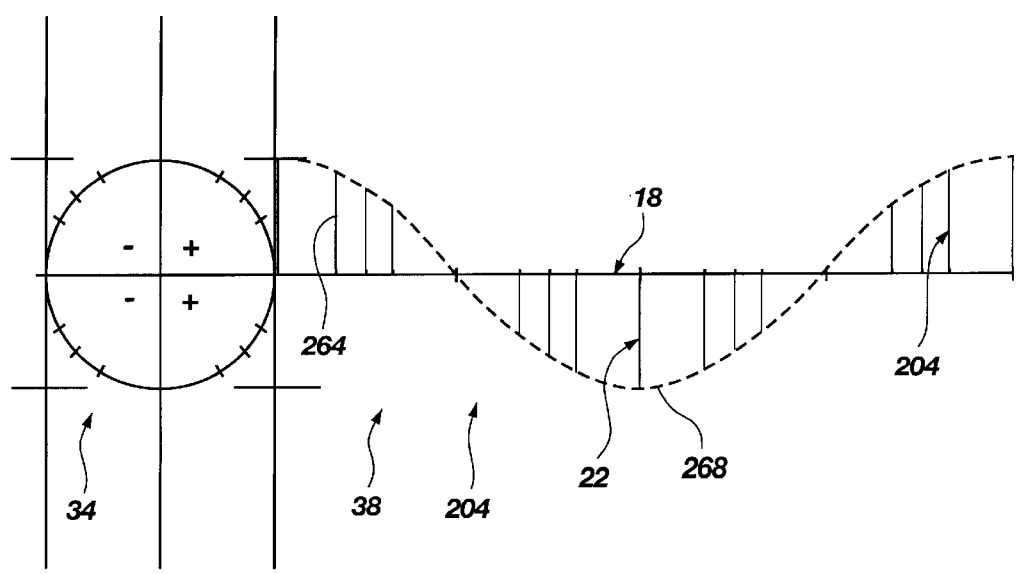
FIG. 12 is a top view of the apparatus with the primary and secondary members in a second position and representing a cosine function.

Referring to FIGS. 11 and 12, the secondary members 22 are configured to demonstrate the cosine function. In the first unit circle position 200, shown in FIG. 11, each of the linear members 22 has the first end 190 coupled to one of the attachment points 196 on the flexible member 18, and the second end 192 disposed on the vertical reference line 46. In addition, the linear members 22 extend perpendicularly to the vertical reference line 46.

It will be noted that each linear member 22 corresponds to a particular angle e and represents the value of the cosine function for that angle. Because the unit circle 34 or circle 54 (FIGS. 2 and 3) has a radius of one unit, the length L of each linear member 22 equals the cosine of the angle $\theta$ to which the linear member 22 corresponds. For example, a second linear member 264 is attached to the flexible member 18 at the first attachment point 252 which corresponds to the first angle point 70 of 30 degrees. A right triangle is formed by the first radial line 66, the vertical reference line 46, and the first cosine line 86, as shown in FIG. 3. The second linear member 264 physically represents the first cosine line 86 (FIG. 3) and has a length L which equals the cosine of 30 degrees. The same is true of the remaining linear members 22. In the second position 204, as shown in FIG. 12, the second ends 192 of the linear members 22 define a cosine wave form, indicated at 268.

In the unit circle position 200, some of the linear members 22 are disposed in the first and fourth quadrants I and IV, and correspond to positive values of the cosine function. Some of the linear members 22 are disposed in the second and third quadrants II and III, and correspond to negative values of the cosine function. In the second position 204, the linear members 22 disposed in the first and fourth quadrants I and IV are disposed on the positive or upper portion of the rectangular coordinate system, while the linear members 22 disposed in the second and third quadrants II and III are disposed on the negative or lower portion of the rectangular coordinate system.

Figure 13:
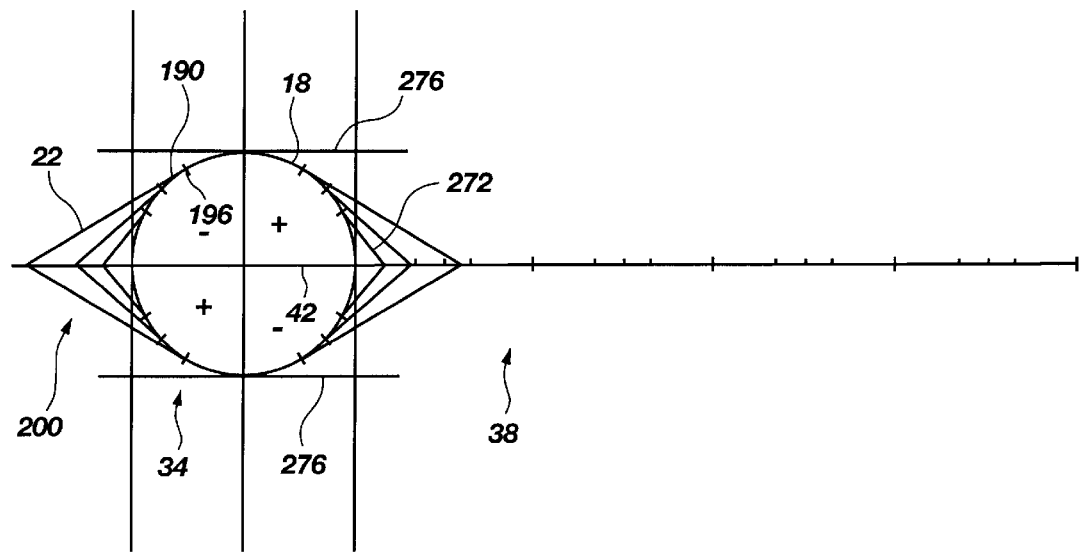
FIG. 13 is a top view of the apparatus with the primary and secondary members in a first position and representing a tangent function.
Figure 14:
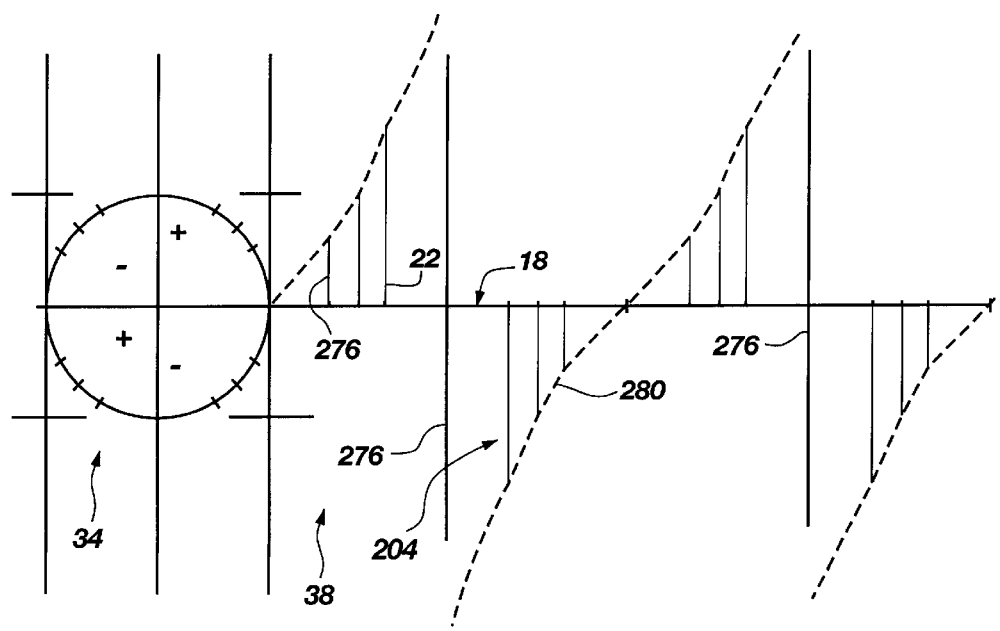
FIG. 14 is a top view of the apparatus with the primary and secondary members in a second position and representing a tangent function.

Referring to FIGS. 13 and 14, the secondary members 22 are configured to demonstrate the tangent function. In the first unit circle position 200, shown in FIG. 13, each of the linear members 22 has the first end 190 coupled to one of the attachment points 196 on the flexible member 18, and the second end 192 disposed on the horizontal reference line 42. In addition, the linear members 22 extend tangentially to the unit circle 34.

It will be noted that each linear member 22 corresponds to a particular angle $\theta$ and represents the value of the tangent function for that angle. Because the unit circle 34 or circle 54 (FIGS. 2 and 3) has a radius of one unit, the length L of each linear member 22 equals the tangent of the angle $\theta$ to which the linear member 22 corresponds. For example, a third linear member 272 is attached to the flexible member 18 at the first attachment point 252 which corresponds to the first angle point 70 of 30 degrees. A right triangle is formed by the first radial line 66, the horizontal reference line 42, and the first tangent line 94, as shown in FIG. 2. The third linear member 272 physically represents the first tangent line 94 (FIG. 3) and has a length L which equals the tangent of 30 degrees. The same is true of most of the remaining linear members 22. It should also be noted that the tangent function at 90 and 270 (90+180n for n $\epsilon$ integers) degrees is undefined. Thus, long linear members 276, representing infinite extension, are coupled to the flexible member 18 at these points. In the second position 204, as shown in FIG. 14, the second ends 192 of the linear members 22 define a tangent wave form, indicated at 280.

In the unit circle position 200, some of the linear members 22 are disposed in the first and third quadrants I and III, and correspond to positive values of the tangent function. Some of the linear members 22 are disposed in the second and fourth quadrants II and IV, and correspond to negative values of the tangent function. In the second position 204, the linear members 22 disposed in the first and third quadrants I and III are disposed on the positive or upper portion of the rectangular coordinate system, while the linear members 22 disposed in the second and fourth quadrants II and IV are disposed on the negative or lower portion of the rectangular coordinate system.

Figure 15:
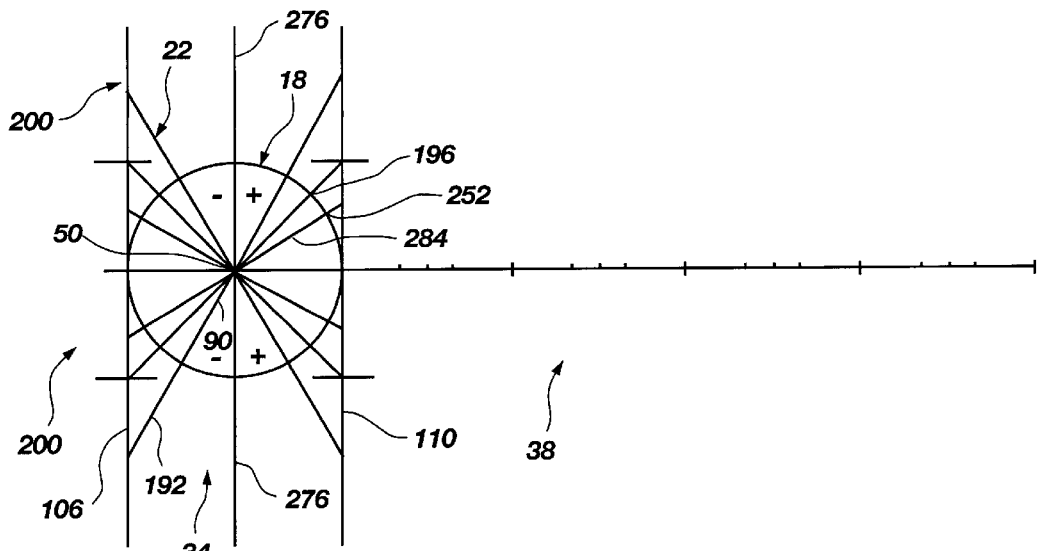
FIG. 15 is a top view of the apparatus with the primary and secondary members in a first position and representing a secant function.
Figure 16:
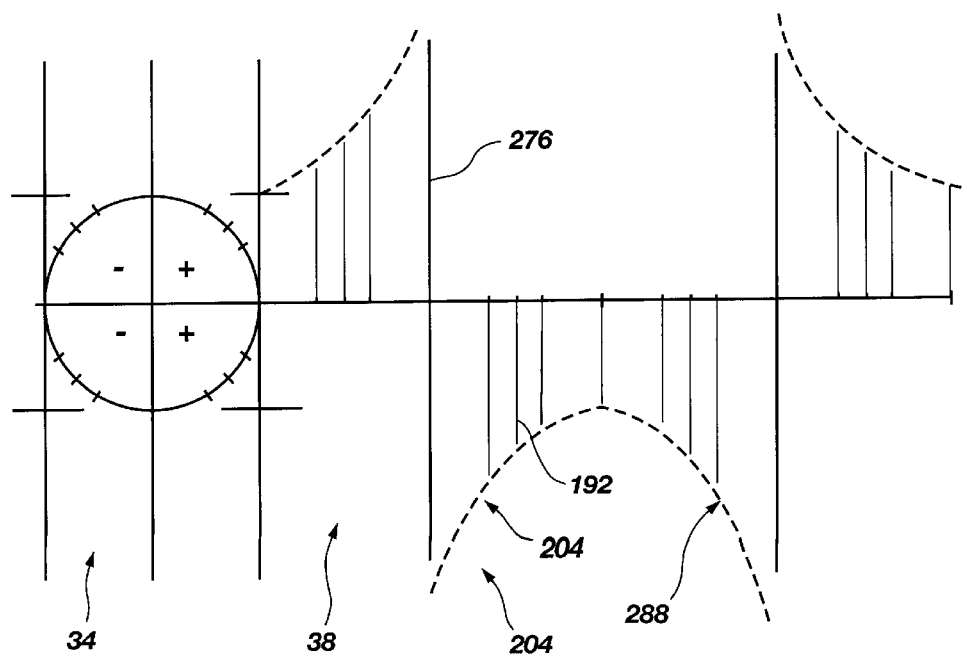
FIG. 16 is a top view of the apparatus with the primary and secondary members in a second position and representing a secant function.

Referring to FIGS. 15 and 16, the secondary members 22 are configured to demonstrate the secant function. In the first unit circle position 200, shown in FIG. 15, each of the linear members 22 has the first end 190 disposed on the center point 50 and the second end 192 disposed on either the first or second side reference lines 106 or 110. The linear members 22 are coupled to one of the attachment points 196 on the flexible member 18 at a point along the length of the linear members 22 between the first and second ends 190 and 192. Each linear member 22 represents the value of the secant function for the particular angle to which it corresponds. For example, a fourth linear member 284 is attached to the flexible member 18 at the first attachment point 252 which corresponds to the first angle point 70 of 30 degrees. A right triangle is formed by the horizontal reference line 42, the second side reference line 110, and the first secant line 126, as shown in FIG. 2. The fourth linear member 284 physically represents the first secant line 126 (FIG. 2) and has a length L which equals the secant of 30 degrees. The same is true of most of the remaining linear members 22. It should also be noted that the secant function at 90 and 270 (90+180n for n $\epsilon$ integers) degrees is undefined. Thus, long linear members 276, representing infinite extension, are coupled to the flexible member 18 at these points. In the second position 204, as shown in FIG. 16, the second ends 192 of the linear members 22 define a secant wave form, indicated at 288. While the linear members 22 are coupled to the flexible member 18 at some point along their length in the first unit circle position 200, the linear members 22 are repositioned in the second position 204 so that the first ends 190 are coupled to the flexible member 18.

In the unit circle position 200, some of the linear members 22 are disposed in the first and fourth quadrants I and IV, and correspond to positive values of the secant function. Some of the linear members 22 are disposed in the second and third quadrants II and III, and correspond to negative values of the secant function. In the second position 204, the linear members 22 disposed in the first and fourth quadrants I and IV are disposed on the positive or lower portion of the rectangular coordinate system, while the linear members 22 disposed in the second and third quadrants II and III are disposed on the negative or lower portion of the rectangular coordinate system.

Figure 17:
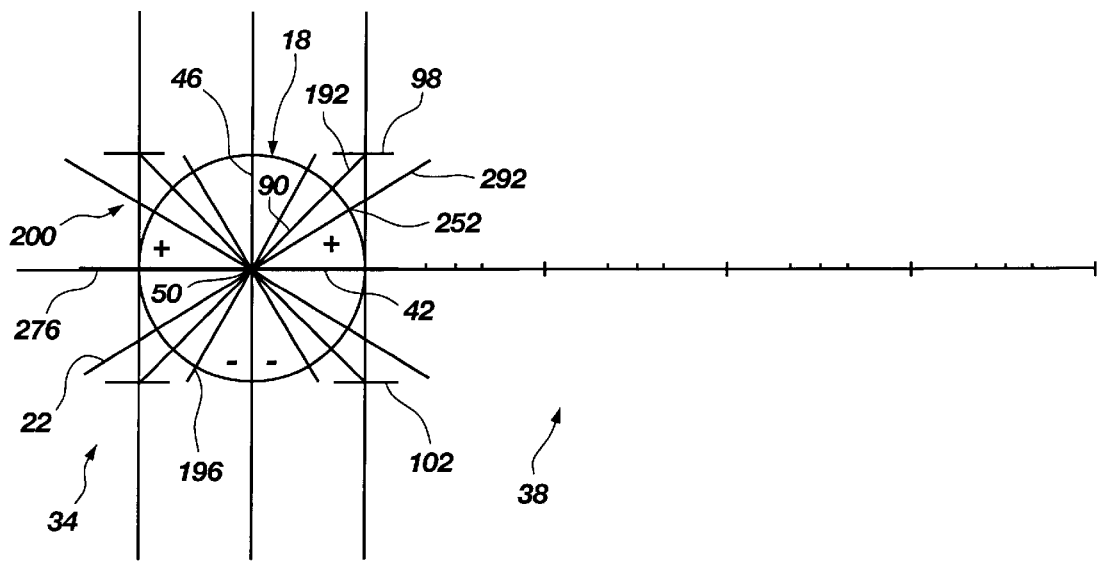
FIG. 17 is a top view of the apparatus with the primary and secondary members in a first position and representing a cosecant function.
Figure 18:
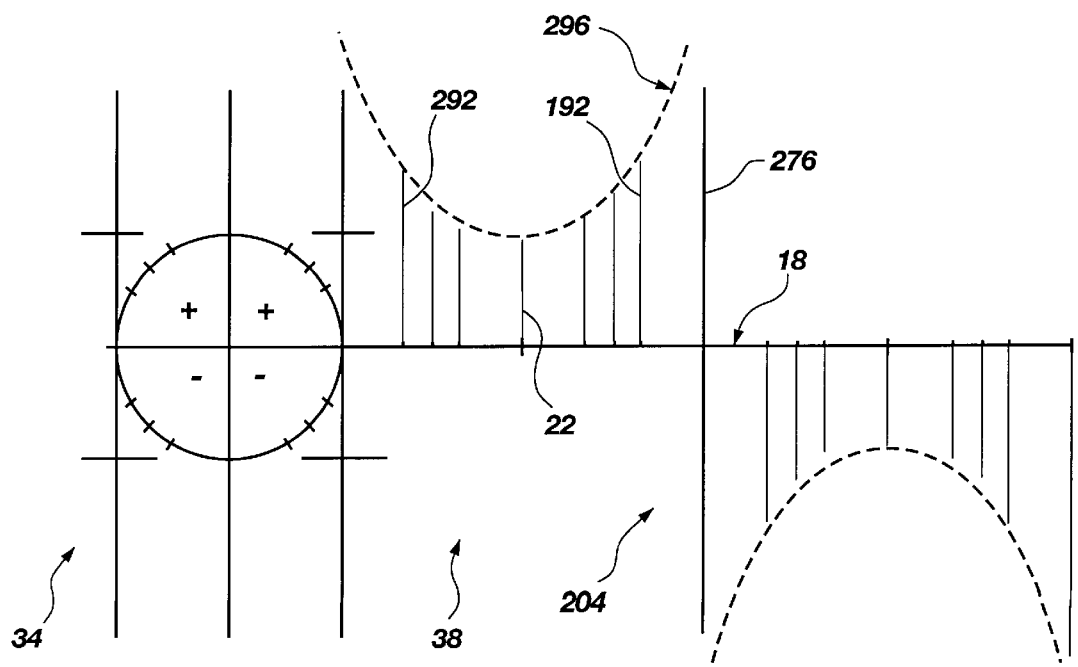
FIG. 18 is a top view of the apparatus with the primary and secondary members in a second position and representing a cosecant function.

Referring to FIGS. 17 and 18, the secondary members 22 are configured to demonstrate the cosecant function. In the first unit circle position 200, shown in FIG. 17, each of the linear members 22 has the first end 190 disposed on the center point 50 and the second end 192 disposed on either the upper or lower reference lines 98 or 102. The linear members 22 are coupled to one of the attachment points 196 on the flexible member 18 at a point along the length of the linear members 22 between the first and second ends 190 and 192. Each linear member 22 represents the value of the cosecant function for the particular angle to which it corresponds. For example, a fifth linear member 292 is attached to the flexible member 18 at the first attachment point 252 which corresponds to the first angle point 70 of 30 degrees. A right triangle is formed by the vertical reference line 46, the upper reference line 98, and the first cosecant line 134, as shown in FIG. 2. The fifth linear member 292 physically represents the first cosecant line 134 (FIG. 2) and has a length L which equals the cosecant of 30 degrees. The same is true of most of the remaining linear members 22. It should also be noted that the cosecant function at 0, 180 and 360

(180n for n ∈ integers) degrees is undefined. Thus, long linear members 276 are coupled to the flexible member 18 at these points. In the second position 204, as shown in FIG. 18, the second ends 192 of the linear members 22 define a cosecant wave form, indicated at 296. While the linear members 22 are coupled to the flexible member 18 at some point along their length in the first unit circle position 200, the linear members 22 are repositioned in the second position 204 so that the first ends 190 are coupled to the flexible member 18.

In the unit circle position 200, some of the linear members 22 are disposed in the first and second quadrants I and II, and correspond to positive values of the cosecant function. Some of the linear members 22 are disposed in the third and fourth quadrants III and IV, and correspond to negative values of the cosecant function. In the second position 204, the linear members 22 disposed in the first and second quadrants I and II are disposed on the positive or upper portion of the rectangular coordinate system, while the linear members 22 disposed in the third and fourth quadrants III and IV are disposed on the negative or lower portion of the rectangular coordinate system.

Figure 19:
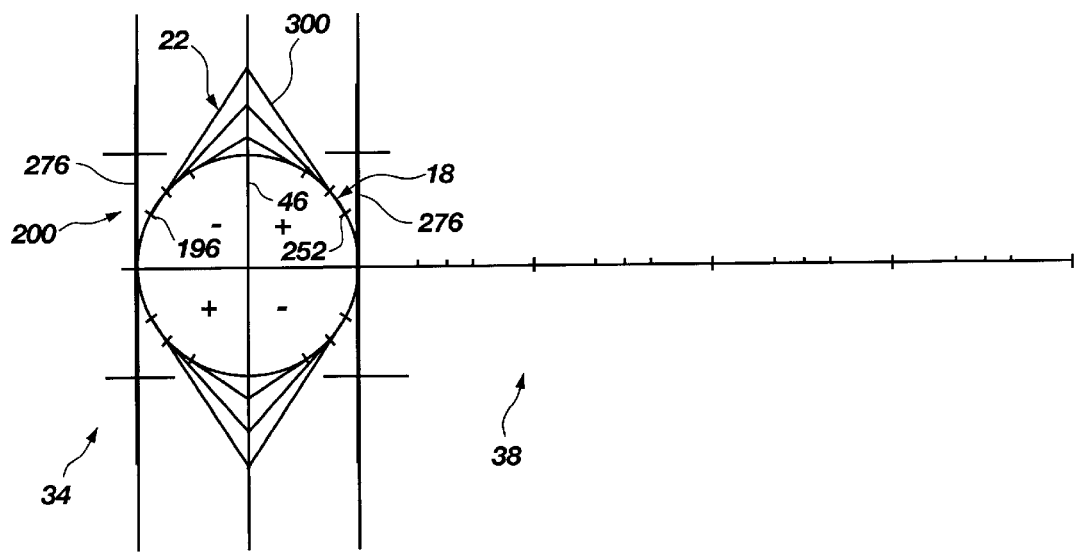
FIG. 19 is a top view of the apparatus with the primary and secondary members in a first position and representing a cotangent function.
Figure 20:
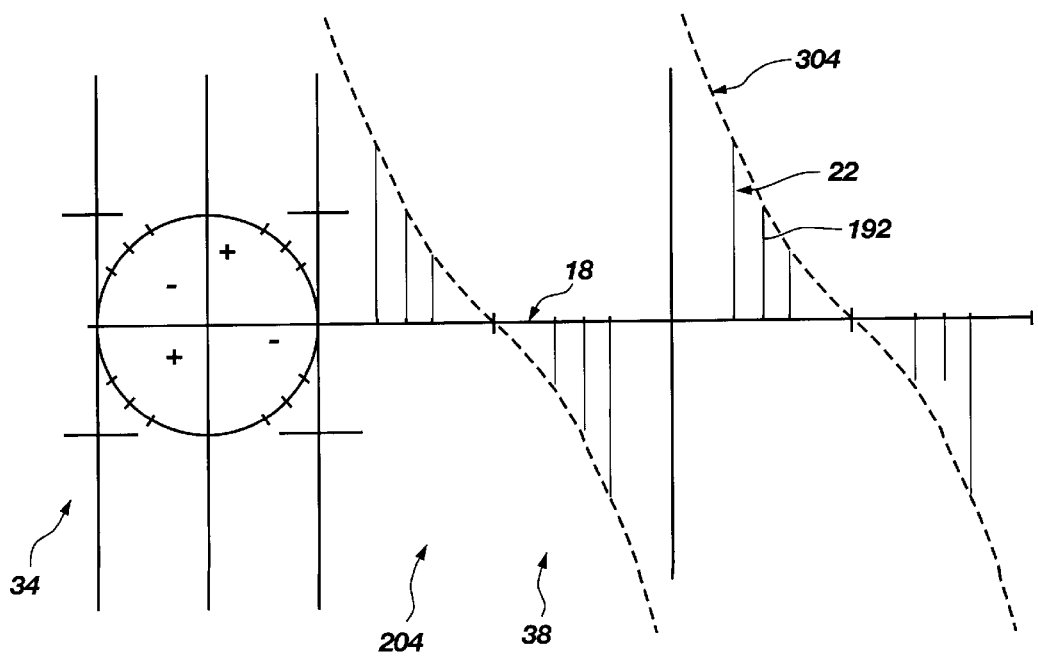
FIG. 20 is a top view of the apparatus with the primary and secondary members in a second position and representing a cotangent function.

Finally, referring to FIGS. 19 and 20, the secondary members 22 are configured to demonstrate the cotangent function. In the first unit circle position 200, shown in FIG. 19, each of the linear members 22 has the first end 190 coupled to one of the attachment points 196 on the flexible member 18, and the second end 192 disposed on the vertical reference line 46. In addition, the linear members 22 extend tangentially to the unit circle 34. Each linear member 22 corresponds to a particular angle θ and represents the value of the cotangent function for that angle. For example, a sixth linear member 300 is attached to the flexible member 18 at the first attachment point 252 which corresponds to the first angle point 70 of 30 degrees. A right triangle is formed by the first radial line 66, the vertical reference line 46, and the first cotangent line 118, as shown in FIG. 2. The sixth linear member 300 physically represents the first cotangent line 118 (FIG. 3) and has a length L which equals the cotangent of 30 degrees. The same is true of most of the remaining linear members 22. It should also be noted that the cotangent function at 0, 180 and 360 (180n for n ∈ integers) degrees is undefined. Thus, long linear members 276, representing infinite extension, are coupled to the flexible member 18 at these points. In the second position 204, as shown in FIG. 20, the second ends 192 of the linear members 22 define a cotangent wave form, indicated at 304.

In the unit circle position 200, some of the linear members 22 are disposed in the first and third quadrants I and III, and correspond to positive values of the cotangent function. Some of the linear members 22 are disposed in the second and fourth quadrants II and IV, and correspond to negative values of the cotangent function. In the second position 204, the linear members 22 disposed in the first and third quadrants I and III are disposed on the positive or upper portion of the rectangular coordinate system, while the linear members 22 disposed in the second and fourth quadrants II and IV are disposed on the negative or lower portion of the rectangular coordinate system.

Therefore, the apparatus 10 of the present invention advantageously provides a physical representation of the trigonometric functions in the unit circle and the rectangular coordinate system. In addition, the apparatus 10 advantageously provides a visual transformation of the trigonometric functions between the unit circle and rectangular coordinate system.

A plurality of linear members 22 may be provided corresponding to each desired angle θ. The trigonometric function to be demonstrated by the linear member 22 as well as the angle represented may be indicated on the linear member 22, as shown in FIG. 5. Linear members 22 representing positive values of the trigonometric functions, may be one color, representing a positive value, while other linear members representing negative values of the trigonometric functions, may be another color, representing a negative value. In addition, the positive or negative value may be indicated by indicia, as shown in FIG. 5. Many of the linear members 22 may be used to demonstrate various different trigonometric functions for different angles. For example, the sine of 30 degrees is the same as the cosine of 60 degrees. Therefore, the same linear member may be used to demonstrate the sine function at 30 degrees, and the cosine function at 60 degrees.

A method for using the apparatus 10 as described above includes positioning and configuring the flexible member 18 and linear members 22 between the unit circle 34 and rectangular coordinate system 38, or between the unit circle configuration, indicated by 180 and 200, and the rectangular coordinate configuration, indicated by 182 and 204. The flexible member 18 and linear members 22 may be moved back and forth between the two systems to facilitate understanding.

For example, the flexible member 18 may be configured into a continuous circle centered about the center point 50, or disposed around the circular wall 158, with the first and second ends 174 and 176 united to define the unit circle 34. Disposing the flexible member 18 on the upper surface 30 of the base 14 and forming the flexible member 18 about the circular wall 158 facilitates the formation of the flexible member 18 into a circular configuration.

The appropriate linear members 22 are coupled to the flexible member 18 at the appropriate attachment points 196. The various lines and indicia depicted on the upper surface 30 of the base 14 assist in determining which linear members 22 attach at which points. In addition, the linear members are oriented with respect to the unit circle 34 based on the desired trigonometric function to be demonstrated. Again, the various lines and indicia facilitate the orientation of the linear members 22. The channels 240 and/or pegs 246 help maintain the placement and orientation of the linear members 22.

The flexible member 18 and linear members 22 then may be positioned in the rectangular coordinate system configuration. The second end 176 of the flexible member 18 is pulled away from the unit circle 34 and moved along the upper surface 30 of the base 14, drawing with it the secondary members 22. The flexible member 18 is "unwrapped" from the unit circle 34 and pulled into a straight horizontal line intersecting the origin point 146 and defining the horizontal axis 138. The linear members 22 are oriented or configured to extend perpendicularly to the straight horizontal line formed by the flexible member 18. Again, the channels 240 and/or pegs 246 may help maintain the position and orientation of the flexible member 18 and linear members 22. In addition, the linear members 22 that represent negative values of the trigonometric function are rotated or pivoted so that they extend downwardly from the straight line. It also may be necessary to move the secondary members 22 with respect to the flexible member 18 so that the first ends 190 of the secondary members 22 are coupled to the flexible member 18, rather than a point along the length.

The flexible member 18 and linear members 22 may be reconfigured between the unit circle 34 and rectangular coordinate system 38 as desired. The linear members 22 preferably remain coupled to the flexible member 18 as the flexible member 18 moves to facilitate demonstration of the physical relationship between the two systems. In addition, it is understood that the flexible member 18 and the linear members 22 may be first configured in the rectangular coordinate system 38 and then reconfigured or moved to the unit circle 34. For example, the second end 176 of the flexible member 18 may be moved away from the rectangular coordinate system 38 drawing with it the linear members 22 which move across the upper surface 30 of the base 14. The flexible member 18 is "wrapped" into a unit circle 34 or "wrapped" around the circular wall 162. The linear members 22 are oriented with respect to the unit circle 34.

In addition, the apparatus of the present invention may be used without the flexible member to simply demonstrate relationships and identities, without moving between the two systems. For example, certain linear members may be disposed on the unit circle to demonstrate particular functions.

Furthermore, the present invention may be computer generated and visually displayed on a monitor. The various components may be visually represented on the monitor, as opposed to physically represented by the apparatus. A computer software program may be used to allow a student to interact with the computer in displaying and manipulating the various components.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An apparatus for teaching a relationship of trigonometric functions between a unit circle and a rectangular coordinate system, the apparatus comprising:

an elongated and flexible primary member having first and second ends and being movable between a series of discrete visual positions and configurations including
  (i) a first circular configuration in which the primary member is disposed in a circle centered about a center point defining a unit circle, and
  (ii) a second linear configuration in which the primary member is disposed in a line intersecting an origin point defining a horizontal axis of a rectangular coordinate system; and a plurality of linear and elongated secondary members each removably coupled to the flexible primary member at one of a series of spaced apart attachment points disposed along the primary member and being moveable between a series of discrete visual positions and configurations including
  (i) a first unit circle position in which each of the plurality of secondary members is oriented with respect to the unit circle to demonstrate a particular trigonometric function, and
  (ii) a second position in which each of the plurality of secondary members is disposed perpendicularly to the horizontal axis defined by the flexible primary member when the primary member is in the second linear configuration with the first end of each of the plurality of secondary members coupled to the flexible primary member.

2. The apparatus of claim 1, wherein the secondary members remain coupled to the primary member as the primary member moves between the first circular configuration and the second linear configuration such that the primary member and secondary members move together.

3. The apparatus of claim 1, wherein each of the spaced apart attachment points is defined by an angle from a horizontal reference line which intersects the center point when the primary member is in the first circular configuration, and wherein the plurality of secondary members are sized and oriented to demonstrate a particular trigonometric function when in the first unit circle position.

4. The apparatus of claim 3, wherein the secondary members are configured to demonstrate a sine function, each of the secondary members having a first end coupled to one of the attachment points of the primary member and the second end disposed on the horizontal reference line so that each secondary member is oriented perpendicularly to the horizontal reference line, and wherein the second ends define a sinusoidal wave in the second position.

5. The apparatus of claim 3, wherein the secondary members are configured to demonstrate a cosine function, each of the secondary members having a first end coupled to one of the attachment points of the primary member and the second end disposed on a vertical reference line perpendicular to the horizontal reference line and intersecting the center point so that each secondary member is oriented perpendicularly to the vertical reference line, and wherein the second ends define a cosine wave form in the second position.

6. The apparatus of claim 3, wherein the secondary members are configured to demonstrate a tangent function, each of the secondary members having a first end coupled to one of the attachment points of the primary member and the second end disposed on the horizontal reference line so that each secondary member is oriented tangent to the unit circle, and wherein the second ends define a tangent wave form in the second position.

7. The apparatus of claim 3, wherein the secondary members are configured to demonstrate a secant function, each of the secondary members having a first end disposed on the center point and the second end disposed on either a first or second side reference line, the first and second side reference lines being perpendicular to the horizontal reference line and tangent to opposite sides of the unit circle, and wherein the second ends define a secant wave form in the second position.

8. The apparatus of claim 3, wherein the secondary members are configured to demonstrate a cosecant function, each of the secondary members having a first end disposed on the center point and the second end disposed on either an upper or lower reference line, the upper and lower reference lines being parallel to the horizontal reference line and tangent to a top and a bottom of the unit circle respectively, and wherein the second ends define a cosecant wave in the second position.

9. The apparatus of claim 3, wherein the secondary members are configured to demonstrate a cotangent function, each of the secondary members having a first end coupled to one of the attachment points of the primary member and the second end disposed on a vertical reference line perpendicular to the horizontal reference line and intersecting the center point so that each secondary member is oriented tangent to the unit circle, and wherein the second ends define a cotangent wave form in the second position.

10. An apparatus for teaching a relationship of trigonometric functions between a unit circle and a rectangular coordinate system, the apparatus comprising:

a base having a flat upper surface, the upper surface having indicia depicting a unit circle with a center point and a rectangular coordinate system with an origin point;

a circular wall formed in the upper surface about the center point of the unit circle and having a plurality of spaced apart openings formed therein;

an elongated and flexible primary member movably disposed on the upper surface of the base and having first and second ends, the primary member being moveable and configured between (i) a first circular configuration in which the primary member is disposed around the circular wall and the center point and defines the unit circle, and (ii) a second linear configuration in which the primary member is disposed in a line intersecting the origin point and defining a horizontal axis of the rectangular coordinate system;

a plurality of linear, elongated secondary members movably disposed on the upper surface of the base and removably coupled to a plurality of attachment points disposed along the primary member, each of the secondary members having first and second ends and being moveable and configured between (i) a first unit circle position in which each of the plurality of secondary members is disposed on the unit circle and oriented with respect to the unit circle based on a particular trigonometric function when the primary member is in the first circular configuration, and (ii) a second position in which each of the plurality of secondary members is disposed on the rectangular coordinate system and oriented perpendicular to the horizontal axis defined by the primary member when the primary member is in the second linear configuration.

11. The apparatus of claim 10, wherein the secondary members remain coupled to the primary member as the primary member moves between the first circular configuration and the second linear configuration such that the primary member and secondary members move together.

12. The apparatus of claim 10, further comprising coupling means for removably coupling the secondary members to the primary member.

13. The apparatus of claim 12, wherein the coupling means comprises a plurality of attachment members each coupled to the primary member at one of the attachment points, each attachment member having opposing, flexible flanges defining a space therebetween for receiving an end of one of the secondary members, the flanges frictionally grasping the end of the secondary member.

14. The apparatus of claim 12, wherein the coupling means comprises a gummy substance at each attachment point for sticking to an end of one of the secondary members.

15. The apparatus of claim 12, wherein the coupling means comprises a slot formed in at least one end of each secondary member for receiving the primary member therein.

16. The apparatus of claim 12, wherein the coupling means comprises a magnet formed in at least one of either the secondary members or the primary member.

17. The apparatus of claim 10, further comprising
retaining means for retaining the position and configuration of the secondary members until moved.

18. The apparatus of claim 17, wherein the retaining means comprises a plurality of channels formed in the upper surface of the base to receive the plurality of secondary members.

19. The apparatus of claim 17, wherein the retaining means comprises a plurality of pegs disposed on the upper surface of the base.

20. The apparatus of claim 10, wherein the indicia depicting the unit circle includes a horizontal reference line intersecting the center point;

a vertical reference line perpendicular to the horizontal reference line and intersecting the horizontal reference line at a point defining the center point;

a circle formed about the center point;

a plurality of angle lines each radiating from the center point to one of a plurality of angle points on the circle, each of the angle lines forming an angle with respect to the horizontal reference line;

a plurality of sine lines each extending from one of the angle points perpendicularly to the horizontal reference line;

a plurality of cosine lines each extending from one of the angle points perpendicularly to the vertical reference line;

a plurality of tangent lines each extending from one of the angle points to the horizontal reference line and tangent to the circle;

an upper reference line extending parallel with the horizontal reference line and tangent to a top of the circle;

a lower reference line extending parallel with the horizontal reference line and tangent to a bottom of the circle;

a first side reference line extending parallel with the vertical reference line and tangent to a first side of the circle;

a second side reference line extending parallel with the vertical reference line and tangent to a second side of the circle;

a plurality of secant lines each extending radially from the center point, through one of the angle points, and to one of the upper or lower reference lines;

a plurality of cosecant lines each extending radially from the center point, through one of the angle points, and to one of the first or second side reference lines; and a plurality of cotangent lines each extending from one of the angle points to the vertical reference line and tangent to the circle; and wherein the indicia depicting the rectangular coordinate system includes a horizontal axis line;

a vertical axis line perpendicular to the horizontal axis line and intersecting the horizontal axis line at a point defining the origin point; and a plurality of spaced apart vertical lines perpendicular to the horizontal axis line and intersecting the horizontal axis line at a plurality of points corresponding to the plurality of angle points.

21. The apparatus of claim 10, wherein the secondary members are colored or have indicia to indicate positive or negative values.

22. A method for teaching a relationship of trigonometric functions between a unit circle and a rectangular coordinate system comprising:

providing an elongated flexible member having first and second ends;

providing a plurality of elongated linear members having first and second ends;

positioning and configuring the flexible member and linear members between (i) a first unit circle configuration by configuring the flexible member into a circle centered about a center point to define a unit circle; and orienting the linear members with respect to the unit circle defined by the flexible member based on a particular trigonometric function to be demonstrated; and (ii) a second rectangular coordinate configuration by configuring the flexible member in a straight horizontal line intersecting an origin point defining a horizontal axis of a rectangular coordinate system; and configuring the linear members to extend perpendicularly from the straight horizontal line formed by the flexible member.

23. The method of claim 22, further comprising reconfiguring the flexible member and linear members between the unit circle configuration and the rectangular coordinate configuration by moving and orienting the flexible member and linear members.

24. The method of claim 22, further comprising providing a base with a flat upper surface; and moveably disposing the flexible member and linear members on the upper surface.

25. The method of claim 22, wherein the trigonometric function demonstrated is the sine function, and wherein positioning and configuring the flexible member and linear members in the unit circle configuration further comprises coupling a first end of each linear member to one of the attachment points of the flexible member;

disposing a second end of each linear member on a horizontal reference line intersecting the center point; and orienting each of the linear members perpendicularly with the horizontal reference line.

26. The method of claim 22, wherein the trigonometric function demonstrated is the cosine function, and wherein positioning and configuring the flexible member and linear members in the unit circle configuration further comprises coupling a first end of each linear member to one of the attachment points of the flexible member;

disposing a second end of each linear member on a vertical reference line perpendicular to the horizontal reference line and intersecting the center point; and orienting each of the linear members perpendicularly with the vertical reference line.

27. The method of claim 22, wherein the trigonometric function demonstrated is the tangent function, and wherein positioning and configuring the flexible member and linear members in the unit circle configuration further comprises coupling a first end of each linear member to one of the attachment points of the flexible member;

disposing a second end of each linear member on the horizontal reference line; and orienting each of the linear members tangent to the unit circle.

28. The method of claim 22, wherein the trigonometric function demonstrated is the secant function, and wherein positioning and configuring the flexible member and linear members in the unit circle configuration further comprises disposing a first end of each linear member on the center point; and disposing a second end of each linear member on a first or second side reference line which are tangent to opposite sides of the unit circle.

29. The method of claim 22, wherein the trigonometric function demonstrated is the cosecant function, and wherein positioning and configuring the flexible member and linear members in the unit circle configuration further comprises disposing a first end of each linear member on the center point; and disposing a second end of each linear member on a top or bottom reference line which are tangent to a top and a bottom of the unit circle respectively.

30. The method of claim 22, wherein the trigonometric function demonstrated is the cotangent function, and wherein positioning and configuring the flexible member and linear members in the unit circle configuration further comprises coupling a first end of each linear member to one of the attachment points of the flexible member;

disposing a second end of each linear member on the vertical reference line; and orienting each of the linear members tangent to the unit circle.

* * * * *